(12) United States Patent
Liu

(10) Patent No.: US 8,116,448 B2
(45) Date of Patent: Feb. 14, 2012

(54) ACOUSTIC ECHO CANCELER

(75) Inventor: En Cai Liu, Hamamatsu (JP)

(73) Assignee: Yamaha Corporation (JP)

( * ) Notice: Subject to any disclaimer, the term of this patent is extended or adjusted under 35 U.S.C. 154(b) by 370 days.

(21) Appl. No.: 12/412,795

(22) Filed: Mar. 27, 2009

(65) Prior Publication Data
US 2009/0245502 A1 Oct. 1, 2009

(30) Foreign Application Priority Data

Mar. 31, 2008 (JP) ................................ 2008-089733

(51) Int. Cl.
*H04M 9/08* (2006.01)
(52) U.S. Cl. ................................ 379/406.01
(58) Field of Classification Search .............. 379/406.01
See application file for complete search history.

(56) References Cited

U.S. PATENT DOCUMENTS

2002/0041678 A1* 4/2002 Basburg-Ertem et al. ........................ 379/406.01

OTHER PUBLICATIONS

Tomas Gansler et al.; "The Fast Normalized Cross-Correlation Double Talk Detector"; Signal Processing; vol. 86, pp. 1124-1139; Jun. 2006.
Kensaku Fujii.; "Double-Talk Detection Method with Detecting Echo Path Fluctuation"; The Institute of Electronics, Information and Communication Engineers; vol. J78-A, No. 3; pp. 314-322; Mar. 1995.
A New Class of Doubletalk Detectors Based on Cross-Correlation; IEEE Transactions on Speech and Audio Processing; vol. 8; pp. 168-172; Mar. 2000.

* cited by examiner

*Primary Examiner* — Alexander Jamal
(74) *Attorney, Agent, or Firm* — Rossi, Kimms & McDowell LLP

(57) ABSTRACT

An echo canceler is constituted of an adaptive filter for generating an echo replica simulating an echo occurring in an echo path lying between a speaker and a microphone, a subtracter for subtracting the echo replica from the sound received by the microphone, a double-talk detector which extracts a prescribed frequency band, in which the signal level is attenuated due to the echo path, from the output signal of the subtracter and which determines a double-talk event with respect to the extracted frequency band, and a controller for controlling the adaptive filter to update the echo replica in the double-talk event.

5 Claims, 4 Drawing Sheets

ACOUSTIC ECHO CANCELER

BACKGROUND OF THE INVENTION

1. Field of the Invention

The present invention relates to acoustic echo cancelers which cancel echoes occurring in communications.

The present application claims priority on Japanese Patent Application No. 2008-89733, the content of which is incorporated herein by reference.

2. Description of the Related Art

Audio communication technologies allowing remote talkers (e.g. near-end talkers and far-end talkers located in remote places respectively) to perform conversations by use of communication devices having microphones and speakers have been widely used in telecommunication systems and television conference systems. In communications using communication devices, audio signals reproduced by speakers are partially input into microphones and mistakenly transmitted to counterpart communication devices, by which counterpart talkers may recognize their voices as echoes. Such a phenomenon causes discomfort for talkers, and a significantly large echo causes howling so as to cause auditory difficulty in communications. Conventionally, echo cancelers (or acoustic echo canceling devices) using adaptive filters have been developed to cancel echoes.

FIG. 5 is a block diagram showing the constitution of an echo canceler 20. A near-end talker having a communication device including the echo canceler 20 receives a speech signal x(t) transmitted from a counterpart communication device of a far-end talker (not shown). The speech signal x(t) is directly supplied to a speaker 26, thus reproducing the far-end talker's speech. The speech signal x(t) is also supplied to an adaptive filer 21 in the echo canceler 20. The sound of the speaker 26 propagates through an echo path EP characterized by an impulse response h(t), in which it is converted into an echo y(t) and then input to a microphone 27, wherein the echo path EP and the impulse response h(t) may vary in a lapse of time. The microphone 27 inputs a speech v(t) of the near-end talker in addition to the echo y(t), thus producing a mixed signal s(t) (where s(t)=v(t)+y(t)).

The adaptive filter 21 uses an estimated impulse response h'(t) for the echo path EP lying between the speaker 26 and the microphone 27 so as to set a filter coefficient, thus dynamically simulating an echo replica y'(t) simulating the echo y(t) based on the input speech signal x(t). The estimated impulse response h'(t) is adaptively produced so as to minimize an echo-canceled signal e(t) output from a subtracter 23. The subtracter 23 subtracts the echo replica y'(t) from the mixed signal s(t) of the microphone 27. Thus, it is possible to produce the echo-canceled signal e(t) based on the sound received by the microphone 27.

It is possible to use various algorithms such as NLMS (Normalized Least Mean Square), RLS (Recursive Least Square), and APA (Affine Projection Algorithm). Using any one of the algorithms, the filter coefficient of the adaptive filter 21 may be erroneously adjusted and updated in response to the speech v(t) of the near-end talker, thus making it very difficult to perform echo cancellation appropriately. In order to solve such a drawback, a double-talk detector 22 (in which the term "double-talk" refers to simultaneous occurrence of the near-end talker's speech and the far-end talker's speech) is used to detect the speech v(t) of the near-end talker so as to stop the adaptive filter 21 updating the filter coefficient in response to the speech v(t) of the near-end talker. Only in the non-speech period in which the microphone 27 does not receive the speech v(t) of the near-end talker, the adaptive filter 21 is activated so as to update the filter coefficient based on the estimated impulse response h'(t), thus achieving high-precision echo cancellation. In the speech-reception period in which the microphone 27 receives the speech v(t) of the near-end talker, the adaptive filter 21 stops updating the filter coefficient, thus performing echo cancellation appropriately.

It is possible to adopt various detection methods for use in the double-talk detector 22 for detecting the speech v(t) of the near-end talker, wherein Non-Patent Documents 1 to 3 teach conventionally-known double-talk detection methods.

- Non-Patent Document 1: "The fast normalized cross-correlation double talk detector" written by Tomas Gansler et al. for SIGNAL PROCESSING, Vol. 86, pp. 1,124 to 1,139, June, 2006
- Non-Patent Document 2: "Double-Talk Detection Method with Detecting Echo Path Fluctuation" written by Kensaku Fujii et al for The Institute of Electronics, Information and Communication Engineers, Vol. J78-A, No. 3, pp. 314-322, March, 1995
- Non-Patent Document 3: "A New Class of Doubletalk Detectors Based on Cross-Correlation" in IEEE Transactions on Speech and Audio Processing, Vol. 8, pp. 168-172, March, 2000

In a first detection method (disclosed in Non-Patent Document 1), the ratio of the mixed signal s(t) (output from the microphone 27) to the speech signal x(t) of the far-end talker is calculated and compared to a prescribed threshold value, wherein it is determined that the microphone actually receives the speech v(t) of the near-end talker when the ratio is higher than the threshold value, while it is determined that the microphone 27 does not receive the speech v(t) of the near-end talker when the ratio is lower than the threshold value.

A second detection method is realized based on the empirical reality in which a residual echo increases in power due to the occurrence of the speech v(t) of the near-end talker, while it decreases in power due to high-precision echo cancellation without the occurrence of the speech v(t) of the near-end talker. Through monitoring the power of a residual echo, it is determined that the speech v(t) of the near-end talker occurs in response to an increase of the residual echo. Since the power of a residual echo is likely increased due to variations of an echo path as well, it is necessary to additionally detect variations of the echo path (as disclosed in Non-Patent Document 2).

Other detection methods have been developed and disclosed in various documents such as Non-Patent Document 3, wherein speech detection is implemented using the coherence of the echo y(t), correlations (or cross-correlations) of speeches, and the like.

In order to effectively cancel echoes, the echo canceler 20 of FIG. 5 further includes a loss insertion unit 24 and a gain controller 25. In actual circumstances, an echo may still remain in the echo-canceled signal e(t) due to various reasons in which the microphone 27 likely inputs noise in addition to the echo y(t) and the speech v(t) of the near-end talker and in which the property of the echo path EP is dynamically varied. In order to suppress the residual echo, the loss insertion unit 24 inserts a loss into the echo-canceled signal e(t) so as to adjust the gain with respect to the echo-canceled signal e(t). The gain controller 25 controls the gain of the echo-canceled signal e(t) in response to the speech v(t) of the near-end talker so as to prevent a loss from occurring in the echo-canceled signal e(t), wherein the gain is adjusted to "1", for example. Thus, it is possible to perform conversation without a chopping of the near-end talker's speech.

The above technology is essentially designed to detect the speech v(t) of the near-end talker and to thereby stop the adaptive filter 21 updating the filter coefficient in a double-talk event, thus achieving appropriate echo cancellation. The first detection method is designed on the premise that the gain of the echo path EP is less than "1", and the speech v(t) of the near-end talker is higher in level than the echo y(t). In actuality, such a premise is not normally established so that the first detection method suffers from erroneous detection of the speech v(t) of the near-end talker and degradation of communication quality due to erroneous detection. The second method needs an additional scheme for detecting variations of an echo path, which increases calculations and memory capacities and which thus results in complexity of the constitution of an echo canceler. In the detection method using the coherence of the echo y(t), it is necessary to accurately calculate a delay in an echo path, which in turn increases calculations. The detection method using the correlation of speeches cannot be adapted to the echo canceler 20 without the convergence of the filter coefficient of the adaptive filter 21.

SUMMARY OF THE INVENTION

It is an object of the present invention to provide an acoustic echo canceler which performs high-precision echo cancellation with a simple constitution and without erroneous detection of a user's speech in a double-talk event.

An acoustic echo canceler for canceling an echo caused by a speaker from a sound received by a microphone is exemplarily constituted of an adaptive filter for generating a an echo replica simulating the echo based on an estimated impulse response adapted to an echo path lying between the speaker and the microphone, a subtracter for subtracting the echo replica from the output signal of the microphone so as to produce an echo-canceled signal, a double-talk detector for extracting a frequency band, in which the signal level is attenuated due to the echo path, from the echo-canceled signal of the subtracter so as to detect a double-talk event based on the extracted frequency band, and a controller for controlling the adaptive filter to stop updating the estimated impulse response or to reduce a step-size for updating the estimated impulse response.

In the above, the level of the sound of the speaker becomes lower in the extracted frequency band compared to another frequency band.

The double-talk detector is exemplarily constituted of a signal level calculator for calculating a signal level with respect to the extracted frequency band, a noise level calculator for calculating a noise level based on the signal level with respect to the extracted frequency band, and a comparator which calculates the ratio of the signal level to the noise level so as to determine the double-talk event in response to a ratio higher than a threshold value or to determine a non-double-talk period in response to a ratio lower than the threshold value.

It is possible to further incorporate into the echo canceler a loss insertion unit for inserting a loss into the echo-canceled signal by multiplying the echo-canceled signal by a gain, and a gain controller for increasing the gain adapted to the echo-canceled signal in the double-talk event.

The echo canceler is designed to determine the double-talk event with respect to the prescribed frequency band, in which the signal level is attenuated due to the echo path lying between the speaker and the microphone and in which the echo is attenuated in level but the near-end talker's speech received by the microphone is not attenuated in level. This principle does not depend upon the special premise employed by a conventionally-known double-talk detection method; hence, it is possible to remarkably reduce error in double-talk detection. Since the double-talk detector of the echo canceler is simply designed to extract the above frequency band, it is possible to precisely detect a double-talk event with a simple constitution.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
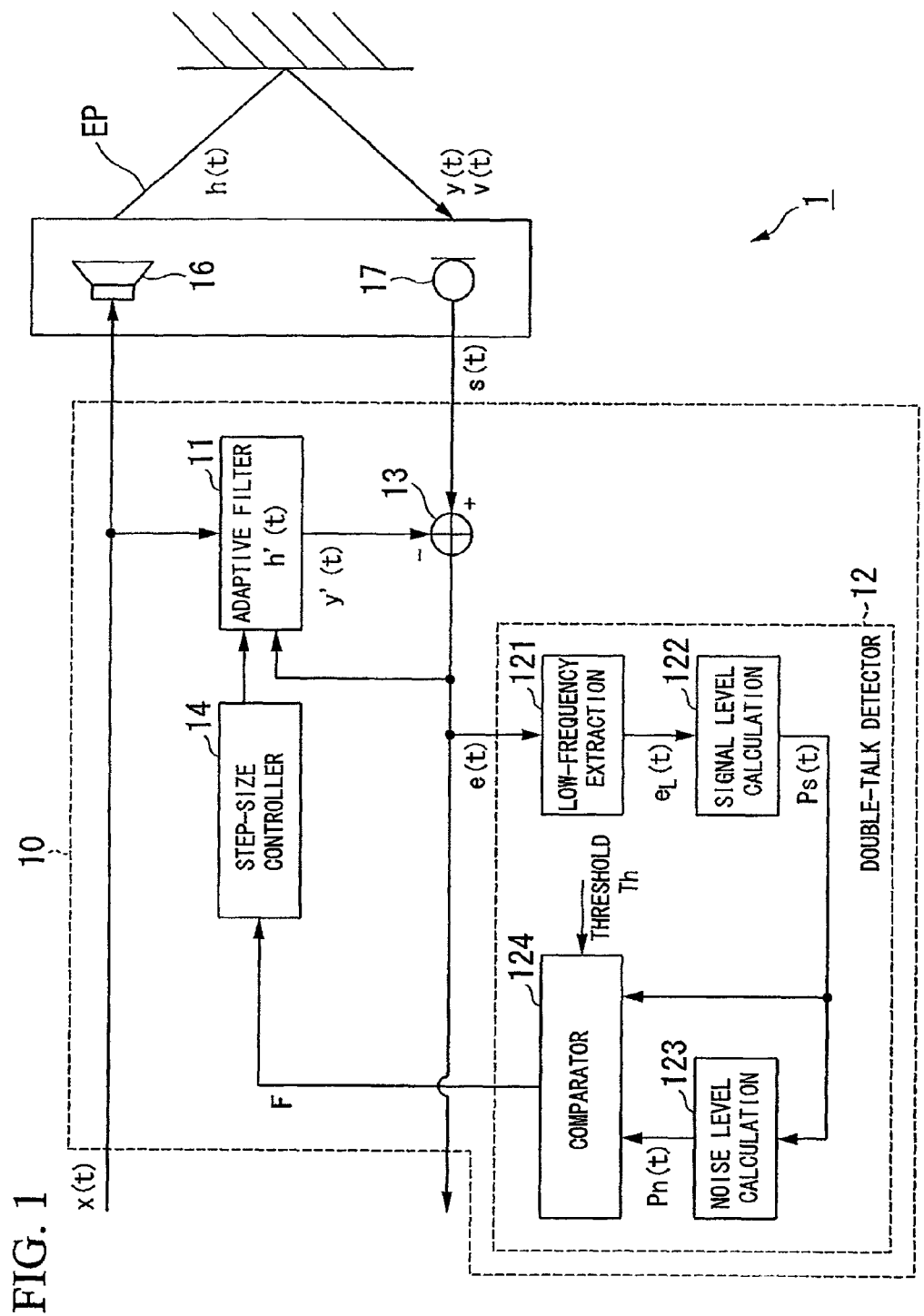
FIG. 1 is a block diagram showing the constitution of an echo canceler according to a preferred embodiment of the present invention.

FIG. 1 is a block diagram showing the constitution of an echo canceler (or an acoustic echo canceling device) 10 according to a preferred embodiment of the present invention. The echo canceler 10 is installed in a portable telephone terminal (or a cellular phone) 1 so as to cancel an echo occurring in communication with a counterpart portable telephone terminal (not shown). The echo canceler 10 is essentially constituted of an adaptive filter 11, a double-talk detector 12, a subtracter 13, and a step-size controller 14. The double-talk detector 12 is constituted of a low-frequency extraction unit 121, a signal level calculation unit 122, a noise level calculation unit 123, and a comparator 124.

The portable telephone terminal 1 is equipped with a speaker 16 and a microphone 17, wherein the near-end talker uses the portable telephone terminal 1 to perform conversation with the far-end talker using the counterpart portable telephone terminal. During conversation, the far-end talker's speech is transmitted via the counterpart portable telephone terminal and is received by the portable telephone terminal 1, in which it is converted into a speech signal x(t). The speech signal x(t) is directly supplied to the speaker 16, thus reproducing the far-end talker's speech. The sound of the speaker 16 propagates through an echo path EP characterized by an impulse response h(t) so as to reach the microphone 17 as an echo y(t), wherein the echo path EP and the impulse response h(t) vary in a lapse of time. The microphone 17 inputs the echo y(t) together with a speech v(t) of the near-end talker so as to produce a mixed signal s(t) (where s(t)=v(t)+y(t)). The echo canceler 10 cancels the echo y(t) from the mixed signal s(t) so as to produce an echo-canceled signal e(t). Then, the portable telephone terminal 1 transmits the echo-canceled signal e(t) to the counterpart portable telephone terminal of the far-end talker.

Next, the operation of the echo canceler 10 will be described in detail. The adaptive filter 11 produces an echo replica y'(t) simulating the echo y(t) based on the speech signal x(t) representing the far-end talker's speech. Specifically, the adaptive filter 11 imparts a prescribed filter coefficient to the speech signal x(t) so as to calculate the echo replica y'(t). The filter coefficient of the adaptive filter 11 represents the estimated impulse response h'(t) estimating the impulse response h(t) of the echo path EP lying between the speaker 16 and the microphone 17. The estimated impulse response h'(t) is adaptively estimated so as to minimize the echo-canceled signal e(t) output from the subtracter 13. Since the impulse response h(t) varies in a lapse of time, the adaptive filter 11 dynamically estimates the estimated impulse response h'(t) so as to update the filter coefficient at an appropriate frequency. Generally speaking, it becomes possible to precisely calculate the echo replica y'(t) as the frequency becomes higher, thus achieving high-precision echo cancellation. In a double-talk event, it is likely that the filter coefficient is erroneously adjusted; hence, the step-size controller 14 (whose operation will be described later) instructs the adaptive filter 11 to stop updating the filter coefficient or to reduce a step-size of the filter coefficient. In a non-double-talk period, the adaptive filter 11 produces the echo replica y'(t) based on the filter coefficient representing the estimated impulse response h'(t). When it comes to a double-talk event, the adaptive filter 11 produces the echo replica y'(t) based on the preceding filter coefficient.

Specifically, the adaptive filter 11 is a FIR (Finite Impulse Response) digital filter, the filter coefficient of which can be updated in accordance with various algorithms such as NLMS (Normalized Least Mean Square), RLS (Recursive Least Square), and APA (Affine Projection Algorithm).

The subtracter 13 subtracts the echo replica y'(t) from the mixed signal s(t) of the microphone 17 so as to produce the echo-canceled signal e(t) representing the sound of the microphone 17 whose echo component is canceled. The echo-canceled signal e(t) is transmitted via the portable telephone terminal 1 to the counterpart portable telephone terminal of the far-end talker. The echo-canceled signal e(t) is also supplied to the double-talk detector 12 which determines the occurrence of a double-talk event, in other words, which makes a determination as to whether or not the microphone 17 receives the speech v(t) of the near-end talker.

In the double-talk detector 12, the echo-canceled signal e(t) is input to the low-frequency extraction unit 121, which is a low-pass filter that extracts only a low-frequency signal $e_L(t)$ whose frequency is lower than a prescribed frequency fc from the echo-canceled signal e(t).

Next, the technological significance of the low-frequency extraction unit 121 in the present embodiment will be described below.

Figure 2:
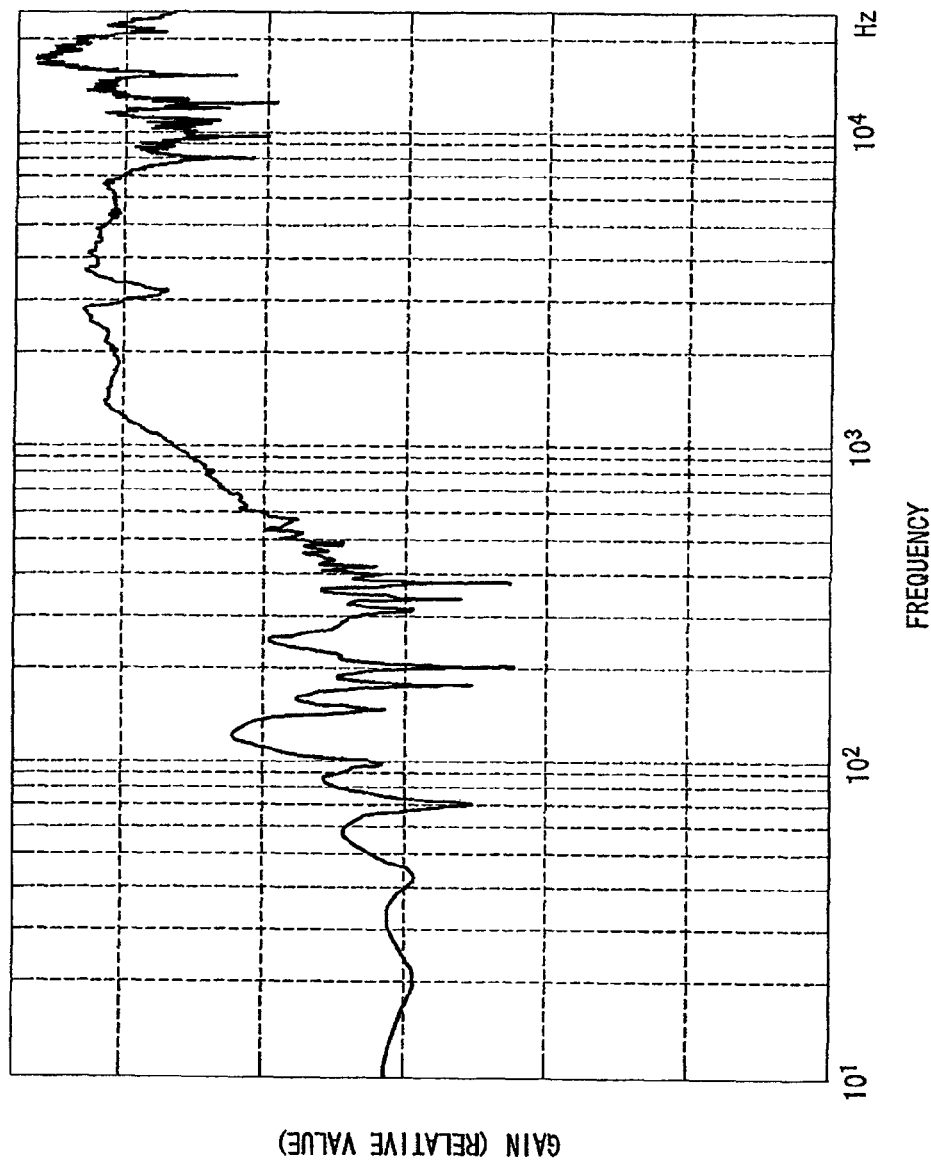
FIG. 2 is a graph showing an example of the frequency characteristics in an echo path from a small-size speaker to a microphone.

Since the portable telephone terminal 1 is a small-size communication device, a small-size speaker having poor low-frequency reproduction ability is normally used for the speaker 16. FIG. 2 exemplarily shows the frequency characteristics in an echo path from a small-size speaker to a microphone. The horizontal axis represents the frequency, while the vertical axis represents the gain (relative value). FIG. 2 shows that the gain is greatly dampened in a low-frequency range whose frequency is 1 kHz or less. The echo y(t) corresponding to a sound which is reproduced by the speaker 16 (having poor low-frequency reproduction ability) and is then received by the microphone 17 has the frequency characteristics, similar to the frequency characteristics of FIG. 2, which are reduced in low-frequency components. Since the near-end talker serving as a sound source of the speech v(t) does not have the frequency characteristics of the speaker 16, the low-frequency components of the speech v(t) are not dampened in level so as to present substantially the same signal level as the high-frequency components. In a double-talk event in which the speech v(t) of the near-end talker occurs simultaneously with the speech signal x(t) representing the far-end talker's speech, the echo-canceled signal e(t) includes numerous low-frequency components, which in turn increases the level of the low-frequency signal $e_L(t)$. In a non-double-talk period, low-frequency components are reduced in the echo-canceled signal e(t), thus decreasing the level of the low-frequency signal $e_L(t)$. Based on the above empirical reality, the present invention pays attention to the low-frequency components of the echo-canceled signal e(t) in consideration of the poor low-frequency reproduction ability of the speaker 16. That is, the present embodiment is designed such that a double-talk event is detected based on a significantly high level of the low-frequency signal $e_L(t)$, while a non-double-talk period is detected based on a low level of the low-frequency signal $e_L(t)$.

In consideration of the frequency characteristics of FIG. 2, the frequency fc of the low-frequency extraction unit 121 is set to 800 Hz, for example.

The determination of a double-talk event is based on a signal-to-noise (S/N) ratio which is calculated based on the low-frequency signal $e_L(t)$ output from the low-frequency extraction unit 121.

Specifically, the signal level calculation unit 122 calculates a peak of the low-frequency signal $e_L(t)$ as a signal level Ps(t). The noise level calculation unit 123 calculates a local minimum value of the signal level Ps(t), which varies in a lapse of time, as a noise level Pn(t). The comparator 124 inputs the signal level Ps(t) and the noise level Pn(t) so as to calculate the S/N ratio, i.e. the ratio of the signal level Ps(t) to the noise level Pn(t), which is then compared to a threshold value Th. Thus, the comparator 124 determines a double-talk event when the S/N ratio is higher than or equal to the threshold value Th, while it determines a non-double-talk period when the S/N ratio is lower than the threshold value Th. Based on the determination result, the comparator 124 produces control information F in accordance with the following equations.

$$F = 1 \text{ if } \frac{Ps(t)}{Pn(t)} \geq Th$$

$$F = 0 \text{ if } \frac{Ps(t)}{Pn(t)} < Th$$

The control information F, which is either "0" or "1", is supplied to the step-size controller 14. Upon receipt of "0", representing a non-double-talk period, the step-size controller 14 instructs the adaptive filter 11 to update the filter coefficient. Upon receipt of "1" representing a double-talk event, the step-size controller 14 instructs the adaptive filter 11 to stop updating the filter coefficient. In the non-double-talk period, the adaptive filter 11 updates the filter coefficient so as to produce the optimum echo replica y'(t) with high precision. In the double-talk event, the adaptive filter 11 outputs the echo replica y'(t) based on the preceding filter coefficient. Thus, the echo canceler 10 outputs the echo-canceled signal e(t) representing the mixed signal s(t) of the microphone 17 whose echo is canceled with high precision in the non-double-talk period. In the double-talk event, it is possible to prevent the echo-canceled signal e(t) from being degraded due to erroneous echo cancellation using the inappropriately updated filter coefficient, thus achieving appropriate echo cancellation without degradation of echo cancellation precision.

In the above, the step-size controller 14 instructs the adaptive filter 11 to "stop" updating the filter coefficient by setting a step-size of the filter coefficient to zero or by reducing the step-size to a very small value around zero. It is possible for the adaptive filter 11 to update the filter coefficient by a fixed step-size or by a variable value which is determined based on a certain control algorithm, for example.

Figure 3:
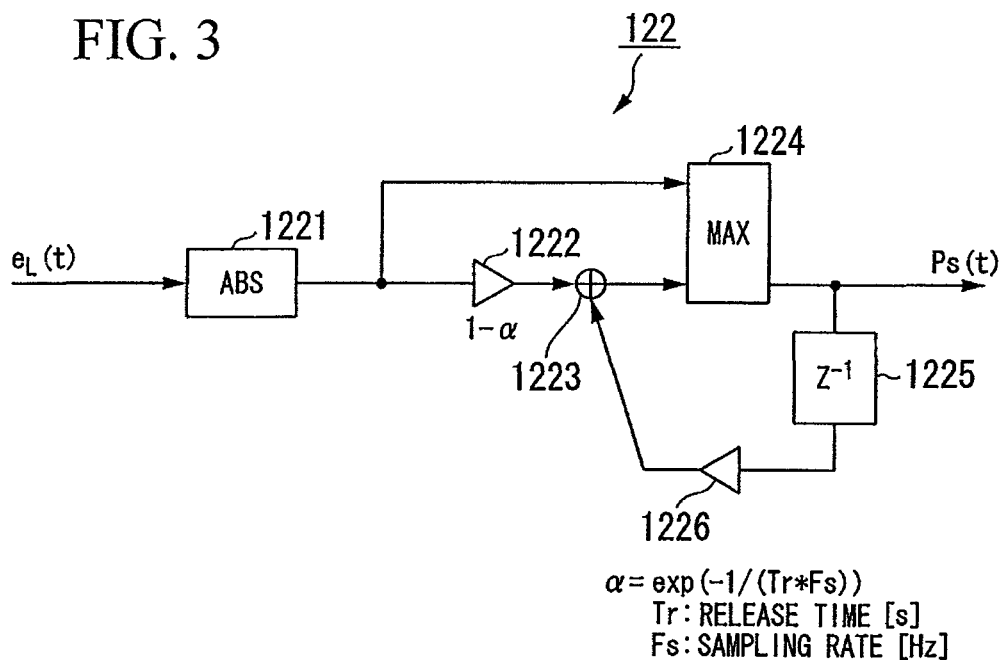
FIG. 3 is a block diagram showing the detailed constitution of a signal level calculation unit included in a double-talk detector installed in the echo canceler shown in FIG. 1.
Figure 4:
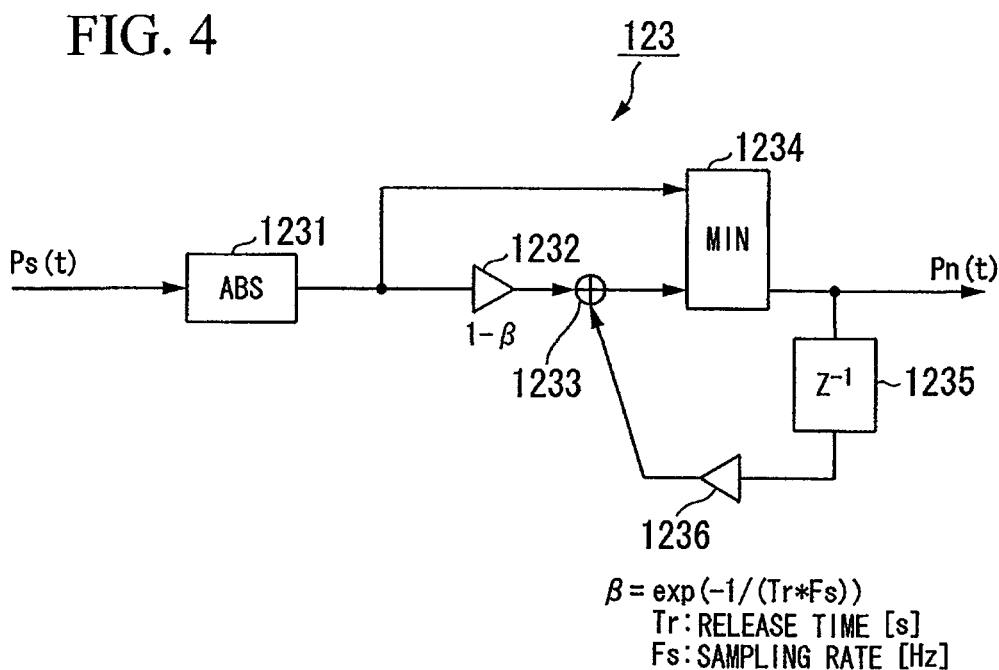
FIG. 4 is a block diagram showing the detailed constitution of a noise level calculation unit included in the double-talk detector installed in the echo canceler shown in FIG. 1.

FIG. 3 is a block diagram showing the detailed constitution of the signal level calculation unit 122, and FIG. 4 is a block diagram showing the detailed constitution of the noise level calculation unit 123.

The signal level calculation unit 122 of FIG. 3 is constituted of an absolute value calculator (ABS) 1221, a multiplier 1222, an adder 1223, a maximum value calculator (MAX) 1224, a delay ($Z^{-1}$) 1225, and a multiplier 1226. The absolute value calculator 1221 calculates an absolute value of the low-frequency signal $e_L(t)$. The multiplier 1222 multiplies the absolute value output from the absolute value calculator 1221 by a coefficient "1−α". The delay 1225 delays a maximum value calculated by the maximum value calculator 1224 by one sampling period. The multiplier multiplies the output of the delay 1225 by a coefficient α. The adder 1223 adds the multiplication results of the multipliers 1222 and 1226 together. The addition result represents the result of the calculation using the coefficient α performed between the present value of the signal $e_L(t)$ and the maximum value which is output from the maximum value calculator 1224 based on the one-sampling-period preceding value of the signal $e_L(t)$. The maximum value calculator 1224 compares the absolute value output from the absolute value calculator 1221 to the addition result of the adder 1223 so as to selectively output the higher one as the signal level Ps(t). The coefficient α is calculated using a release time Tr and a sampling rate Fs (both are fixed constants) by the following equation.

$$\alpha = \exp\left(\frac{-1}{Tr \times Fs}\right)$$

Thus, the signal level calculation unit 122 outputs the present absolute value of the signal $e_L(t)$ which is higher than the preceding value or outputs the preceding value which is higher than the present value, thus retaining the maximum value of the signal $e_L(t)$ as the signal level Ps(t).

The noise level calculation unit 123 of FIG. 4 is constituted of an absolute value calculator (ABS) 1231, a multiplier 1232, an adder 1233, a minimum value calculator (MIN) 1234, a delay ($Z^{-1}$) 1235, and a multiplier 1236. The absolute value calculator 1231 outputs the absolute value of the signal level Ps(t), which is then multiplied by a coefficient "1−β" in the multiplier 1232. The delay 1235 delays the minimum value output from the minimum value calculator 1234 by one sampling period. The output of the delay 1235 is multiplied by a coefficient β in the multiplier 1236. The adder 1233 adds the multiplication results of the multipliers 1232 and 1236 together. The addition result is the result of a calculation using the coefficient β performed between the present value of the signal level P(s) and the minimum value which is output from the minimum value calculator 1234 based on the one-sampling-period preceding value of the signal level Ps(t). The minimum value calculator 1234 compares the absolute value output from the absolute value calculator 1231 to the addition result of the adder 1233 so as to selectively output the lower one as the noise level Pn(t). The coefficient β is calculated using the release time Tr and the sampling rate Fs (both fixed constants) by the following equation.

$$\beta = \exp\left(\frac{-1}{Tr \times Fs}\right)$$

Thus, the noise level calculation unit 123 outputs the present absolute value of the signal level Ps(t) which is lower than the preceding value or outputs the preceding value which is lower than the present value, thus retaining the minimum value of the signal level Ps(t) as the noise level Pn(t).

As described above, the present embodiment is designed to pay attention to low-frequency components of the speech signal x(t) which are reproduced by the speaker 16 having poor low-frequency reproduction ability, wherein it determines a double-talk event in the case of the high level of the low-frequency components while it determines a non-double-talk period in the case of the low level of the low-frequency components. Since the present embodiment is not designed based on the foregoing premise used by a conventionally-known double-talk detection method, it is possible to remarkably reduce the probability of causing erroneous detection of a double-talk event. Due to the simplicity of the constitution of the present embodiment including a simple scheme for extracting low-frequency components in comparison with the constitution of a conventionally-known double-talk detection method, it is possible to precisely detect a double-talk event with small calculations. Thus, it is possible to achieve high-precision and low-cost echo cancellation with the echo canceler 10 of the present embodiment.

The present embodiment can be further modified in various ways and subject to design choices, which will be described below.

The present embodiment is designed on the premise that the speaker 16 is a small-size speaker having poor low-frequency reproduction ability, wherein the low-frequency extraction unit 121 extracts low-frequency components so as to discriminate between the double-talk event and the non-double-talk period; but this is not a restriction. It is possible to detect a double-talk event by extracting a frequency band in which the echo y(t) is attenuated in level by the echo path EP (wherein, the term "echo path" embraces other components and media, which acoustically affect the sound of the speaker 16, other than the speaker 16). That is, it is possible to change the low-frequency extraction unit 121 with a band-pass filter for extracting a frequency band in which the speech v(t) of the near-end talker is not attenuated in level but the echo y(t) is attenuated in level. The echo canceler 10 can be modified to use such a band-pass filter instead of the low-frequency extraction unit 121, thus demonstrating high-precision echo cancellation.

The echo canceler 10 can be applied to other electronic devices other than the portable telephone terminal 1, such as personal digital assistants (PDA), portable game devices, portable car navigation devices, and fixed telephone terminals.

It is possible to modify the echo canceler 10 in such a way that the mixed signal s(t) of the microphone 17 is directly input to the low-frequency extraction unit 121.

In order to further reduce detection error, the comparator 124 is modified to determine whether or not, after determination of a double-talk event by an inequality of Ps(t)/Pn(t)≧Th, such a double-talk event still continues under an inequality of P(t)/Pn(t)<Th.

Figure 5:
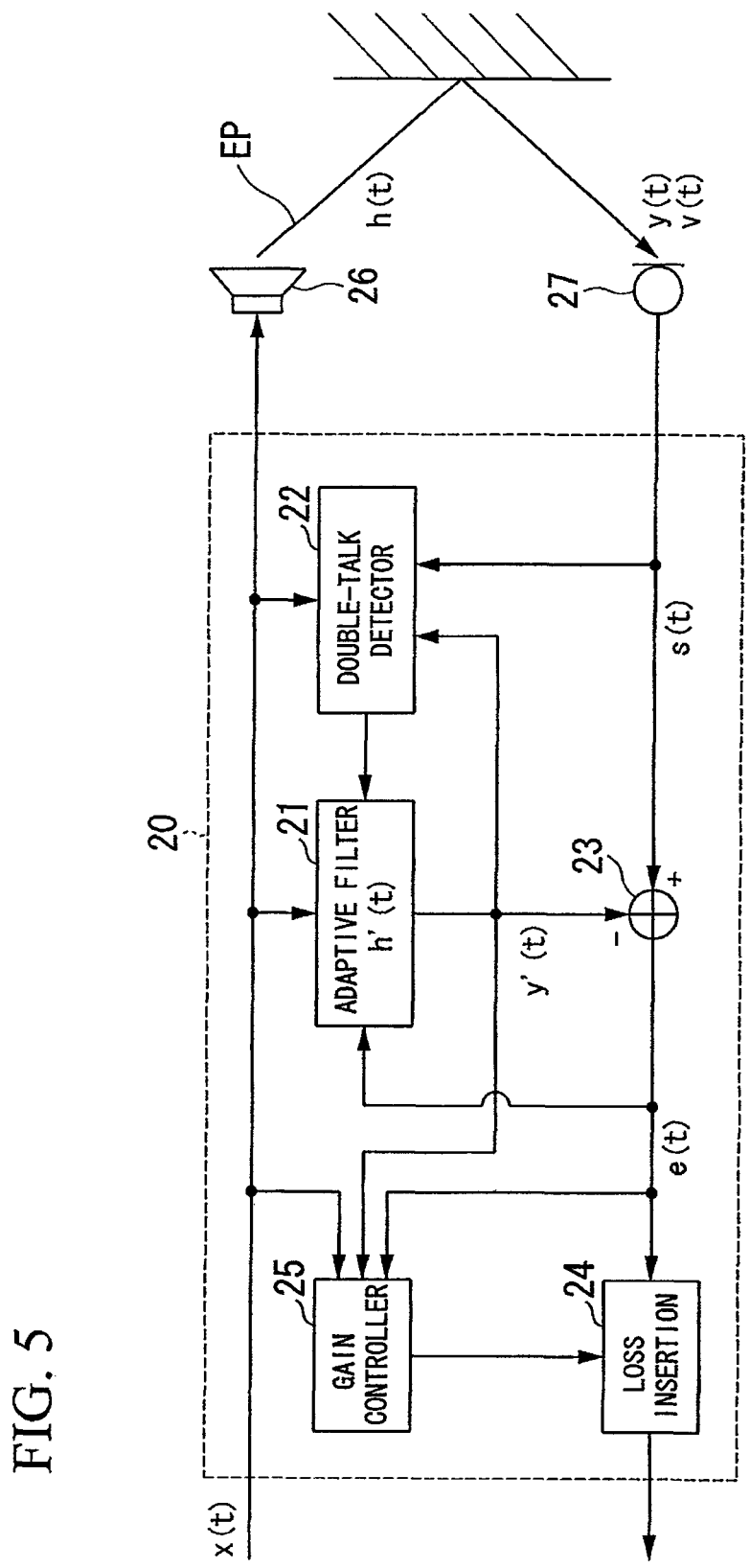
FIG. 5 is a block diagram showing the constitution of an echo canceler adopting a conventionally-known double-talk detection method.

Similar to the constitution of the echo canceler 10 shown in FIG. 5, the echo canceler 10 is modified to further include a loss insertion unit which inserts a loss into the echo-canceled signal e(t) by adjusting the gain of the echo-canceled signal e(t) (i.e. by multiplying the echo-canceled signal e(t) by an appropriate gain) for the purpose of suppression of a residual echo remaining in the echo-canceled signal e(t), and a gain controller which controls the gain of the echo-canceled signal e(t) to avoid the occurrence of a loss (i.e. which sets the gain to "1" or which increases the gain within the range between "0" and "1"), thus achieving high-precision conversation having no chopping of the near-end talker's word or speech.

Finally, the present invention is not necessarily limited to the present embodiment and its variations, which can be further modified in various ways within the scope of the invention defined by the appended claims.

What is claimed is:

1. An acoustic echo canceler for canceling an echo caused by a speaker from a sound received by a microphone, the acoustic echo canceler comprising:
   an adaptive filter for generating an echo replica simulating the echo based on an estimated impulse response adapted to an echo path lying between the speaker and the microphone;
   a subtracter for subtracting the echo replica from an output signal of the microphone so as to produce an echo-canceled signal;
   a double-talk detector for extracting a frequency band, which has a frequency equal to or lower than a predetermined frequency, at which a reproducing ability of the speaker becomes degraded in comparison to another frequency band higher than the predetermined frequency, in which a signal level is attenuated due to the echo path, from the echo-canceled signal of the subtracter so as to detect a double-talk event based on the extracted frequency band; and
   a controller for controlling the adaptive filter to stop updating the estimated impulse response or to reduce a step-size for updating the estimated impulse response.

2. The acoustic echo canceler according to claim 1, wherein a level of a sound of the speaker becomes lower in the extracted frequency band compared to another frequency band.

3. An acoustic echo canceler for canceling an echo caused by a speaker from a sound received by a microphone, the acoustic echo canceler comprising:
   an adaptive filter for generating an echo replica simulating the echo based on an estimated impulse response adapted to an echo path lying between the speaker and the microphone;
   a subtracter for subtracting the echo replica from an output signal of the microphone so as to produce an echo-canceled signal;
   a double-talk detector for extracting a frequency band, in which a signal level is attenuated due to the echo path, from the echo-canceled signal of the subtracter so as to detect a double-talk event based on the extracted frequency band; and
   a controller for controlling the adaptive filter to stop updating the estimated impulse response or to reduce a step-size for updating the estimated impulse response,
   wherein the double-talk detector includes:
      a signal level calculator for calculating a signal level with respect to the extracted frequency band;
      a noise level calculator for calculating a noise level based on the signal level with respect to the extracted frequency band; and
      a comparator which calculates a ratio of the signal level to the noise level so as to determine the double-talk event in response to the ratio higher than a threshold value or to determine a non-double-talk period in response to the ratio lower than the threshold value.

4. The acoustic echo canceler according to claim 1, further comprising a loss insertion unit for inserting a loss into the echo-canceled signal by multiplying the echo-canceled signal by a gain and a gain controller for increasing the gain adapted to the echo-canceled signal in the double-talk event.

5. The acoustic echo canceler according to claim 1, wherein the predetermined frequency is about 1 kHz.

* * * * *